United States Patent
Stanek et al.

(10) Patent No.: US 9,849,751 B2
(45) Date of Patent: Dec. 26, 2017

(54) ADAPTIVE CONTROL OF AUTOMOTIVE HVAC SYSTEM USING CROWD-SOURCING DATA

(71) Applicant: FORD GLOBAL TECHNOLOGIES, LLC, Dearborn, MI (US)

(72) Inventors: Joseph Stanek, Northville, MI (US); John A. Lockwood, Canton, MI (US); Mark Davison, Dearborn, MI (US); Jeffrey A. Palic, Canton, MI (US); Lisa Scott, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 400 days.

(21) Appl. No.: 14/596,433

(22) Filed: Jan. 14, 2015

(65) Prior Publication Data
US 2016/0200166 A1 Jul. 14, 2016

(51) Int. Cl.
*B60H 1/00* (2006.01)
*F02N 11/12* (2006.01)
(Continued)

(52) U.S. Cl.
CPC ..... *B60H 1/00657* (2013.01); *B60H 1/00742* (2013.01); *B60H 1/00771* (2013.01); *B60H 1/00778* (2013.01); *B60H 1/00785* (2013.01); *B60H 1/00849* (2013.01); *B60H 1/00878* (2013.01); *B60H 1/00985* (2013.01); *F02N 11/12* (2013.01); *F02N 11/0807* (2013.01); *F02N 2300/306* (2013.01); *G08G 1/096725* (2013.01); *G08G 1/096791* (2013.01)

(58) Field of Classification Search
CPC ........... B60H 1/00657; B60H 1/00742; B60H 1/00771; B60H 1/00778; B60H 1/00785; B60H 1/00849; B60H 1/00878; B60H 1/00985; F02N 11/12; F02N 11/0807; F02N 2300/306; G01C 21/3407; G08G 1/096725; G08G 1/096791
USPC ..... 701/36, 1; 165/203, 266, 267; 123/179.3
See application file for complete search history.

(56) References Cited

U.S. PATENT DOCUMENTS 5,054,686 A 10/1991 Chuang
5,104,037 A 4/1992 Karg et al.
(Continued)

*Primary Examiner* — Marthe Y Marc-Coleman
(74) *Attorney, Agent, or Firm* — Vichit Chea; MacMillan, Sobanski & Todd, LLC

(57) ABSTRACT

A motor vehicle comprises an HVAC system including a climate control circuit coupled to onboard sensors, a human-machine interface, and climate actuators. The actuators are responsive to respective command parameters generated by the control circuit in response to the sensors and the human-machine interface. A wireless communication system transmits vehicle HVAC data to and receives crowd data from a remote server. The control circuit initiates a request for crowd data via the communication system to the remote server, wherein the request includes peer parameters for identifying a vehicle environment. The control circuit receives a response via the communication system from the remote server. The response comprises crowd data and at least one weight indicating a confidence level associated with the crowd data. The control circuit generates at least one command parameter using a set of fuzzy rules responsive to the crowd data and the weight from the response.

15 Claims, 5 Drawing Sheets

(51) Int. Cl.
*F02N 11/08* (2006.01)
*G08G 1/0967* (2006.01)

(56) References Cited

U.S. PATENT DOCUMENTS

| | | |
|---|---|---|
| 5,553,661 A | 9/1996 | Beyerlein et al. |
| 5,878,809 A | 3/1999 | Heinle |
| 6,237,675 B1 | 5/2001 | Oehring et al. |
| 6,886,352 B2 | 5/2005 | Yoshinori et al. |
| 8,096,482 B2 | 1/2012 | Dage |
| 8,694,205 B1 | 4/2014 | Yerke et al. |
| 2003/0039298 A1 | 2/2003 | Eriksson et al. |
| 2009/0025412 A1* | 1/2009 | Takehisa ............ B60H 1/00764 62/244 |
| 2012/0109429 A1 | 5/2012 | Shiota et al. |
| 2012/0293315 A1 | 11/2012 | Schunder et al. |
| 2012/0312520 A1 | 12/2012 | Hoke et al. |
| 2013/0124011 A1* | 5/2013 | Kwon ................... B60S 1/0807 701/2 |
| 2013/0255930 A1 | 10/2013 | Prakah-Asante et al. |
| 2014/0100716 A1* | 4/2014 | Kawai ..................... B60L 11/14 701/2 |
| 2014/0330453 A1* | 11/2014 | Nakagawa ......... B60H 1/00428 701/2 |
| 2016/0048142 A1* | 2/2016 | Chan .................... F24F 11/0012 700/276 |

* cited by examiner

ADAPTIVE CONTROL OF AUTOMOTIVE HVAC SYSTEM USING CROWD-SOURCING DATA

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to adaptive automotive climate control systems, and, more specifically, to the collection and distribution of crowd based HVAC data via a central cloud server system.

Climate control systems provide important functions within automotive vehicles including thermal comfort for occupants and maintaining visibility through vehicle window glass. Since heating, ventilating, and air conditioning (HVAC) systems can consume large amounts of energy, however, it is desirable to optimize HVAC operation to perform the climate functions in an energy efficient manner. Efficiency may be particularly important for electric and hybrid vehicles, for example, where stored electrical energy from a battery is used to meet the requirements of the HVAC system. Improved efficiency and customer satisfaction have been obtained using HVAC control systems that automatically adapt HVAC operation to the temperature/humidity conditions in and around the vehicle, energy/fuel status, occupancy status, and other factors.

Vehicle preconditioning occurs just prior to the time that a user (e.g., driver) of a vehicle enters the vehicle. Preconditioning may include heating or cooling of the passenger cabin and/or defrosting of the windows, for example. A typical preconditioning event may be triggered by a remote engine start via a wireless transmitter or at a prescheduled time, for example. Choosing the best use of the HVAC system for efficiently preparing the vehicle for use is especially challenging in view of limitations for automatically fully characterizing the HVAC environment using vehicle mounted sensors. For example, the extent of ice or frost on the windows may be unknown. Internal and external ambient temperature measurements may not always be sufficient to predict the level of heating or cooling that would be perceived as the most comfortable, either generally or for a particular person or type of person. Off-board (i.e., remotely reported) weather information has been used as an input to HVAC controllers, but even with such additional information it has not been possible to identify with sufficient reliability what levels of HVAC operation are best suited for preconditioning a vehicle.

SUMMARY OF THE INVENTION

Cloud computing is a model for enabling network access to a shared pool of configurable computing resources which allows sharing of information between different vehicles in real time. The present invention uses centralized cloud computing resources to collect HVAC-related data from a crowd (e.g., vehicle fleet) for redistribution to individual vehicles so that HVAC adaptation can be conducted according to the operational settings of HVAC systems in crowd vehicles that are sufficiently similar to the individual vehicle (i.e., that are a close peer).

In one aspect of the invention, a motor vehicle comprises a heating, ventilating, air conditioning (HVAC) system including a climate control circuit coupled to a plurality of onboard sensors, a human-machine interface, and a plurality of climate actuators. The actuators are responsive to respective command parameters generated by the control circuit in response to the sensors and the human-machine interface. A wireless communication system transmits vehicle HVAC data to and receives crowd data from a remote server. The control circuit initiates a request for crowd data via the communication system to the remote server, wherein the request includes peer parameters for identifying a vehicle environment. The control circuit receives a response via the communication system from the remote server. The response comprises crowd data and at least one weight indicating a confidence level associated with the crowd data. The control circuit generates at least one command parameter using a set of fuzzy rules responsive to the crowd data and the weight from the response.

DETAILED DESCRIPTION OF PREFERRED EMBODIMENTS

Figure 1:
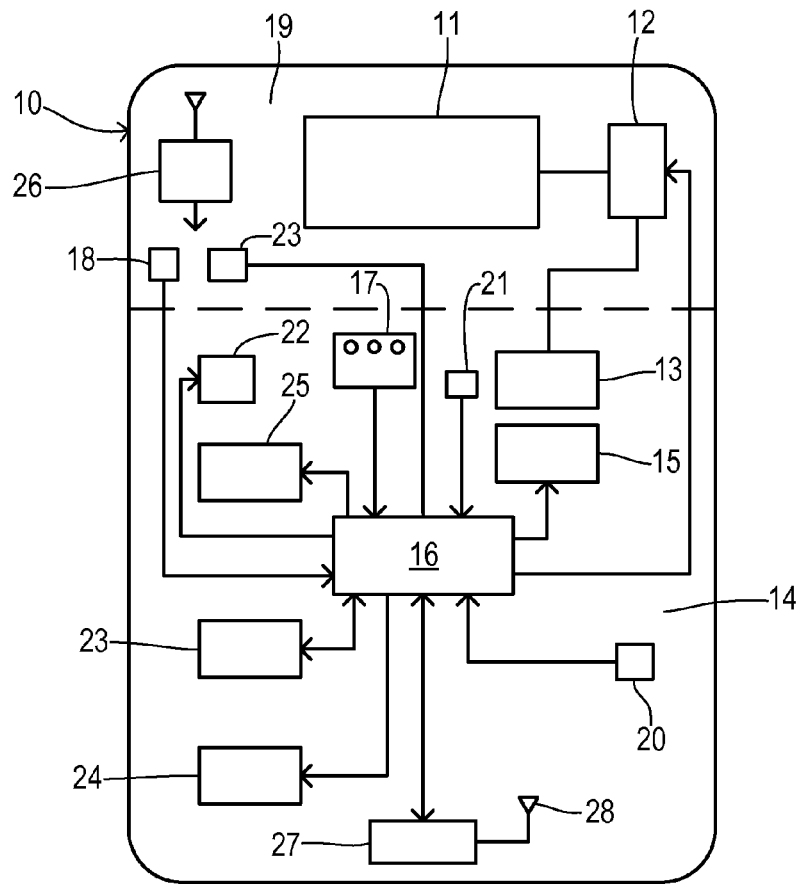
FIG. 1 is a a block diagram showing a vehicle configured to employ various embodiments of the present invention.

Referring now to FIG. 1, a vehicle 10 includes a powertrain 11 which may be comprised of an internal combustion engine fueled by gasoline, an electric traction motor powered by a battery, or both (e.g., in a hybrid configuration). An air conditioning compressor 12 may be driven mechanically or electrically to supply refrigerant to an evaporator 13 within a passenger cabin 14. A variable-speed blower 15 includes a fan wheel to direct an air flow through evaporator 13 under control of a climate control circuit 16. Control circuit 16 may be comprised of a programmable microcontroller and/or dedicated electronic circuitry as known in the art. It is connected to various onboard sensors, actuators (such as compressor 12 and blower 15), and a human-machine interface (HMI) 17 as also known in the art. HMI 17 may comprise a control panel or control head having an information display (e.g., alphanumeric and/or indicator lights) and manual control elements (e.g., switches or dials) used by the driver or other vehicle occupant to set a desired temperature and/or blower speed for the heating/ cooling of cabin 14, to activate heated/cooled surfaces, to modify air distribution modes, and the like.

Sensors coupled to control circuit 16 may typically include an exterior (i.e., ambient) temperature sensor 18 (which may be located in an engine compartment 19) and an internal comfort sensor 20 which generates signal(s) identifying comfort parameters such as an internal cabin temperature signal and/or an internal humidity signal, and provides the signal(s) to control circuit 16. An evaporator temperature sensor 21 associated with evaporator 13 generates an evaporator temperature signal according to an actual temperature within the evaporator and provides it to controller 16.

A plurality of HVAC climate actuators are coupled to control circuit 16 to receive corresponding command parameters generated by control circuit 16 in response to the sensors and HMI 17. In the example shown, the actuators further include a heater core flow control valve 22, a windshield-mounted resistive surface heater 23, a seat heating/cooling system 23, an exterior mirror de-icer 24, and blend door/mode actuators 25. Many additional climate actuators are known and could be used in the present invention, including but not limited to heated steering wheels, auxiliary electric heaters, and windshield wipers and washers.

Vehicle 10 may include a remote keyless entry (RKE) receiver 26 for receiving remote control signals from a transmitter carrier by a driver to initiate a remote engine start event, for example. An interconnection (not shown) via an in-vehicle communication system such as a multiplex bus between receiver 26 and control circuit 16 may trigger an HVAC preconditioning in response to the remote engine start.

Figure 2:
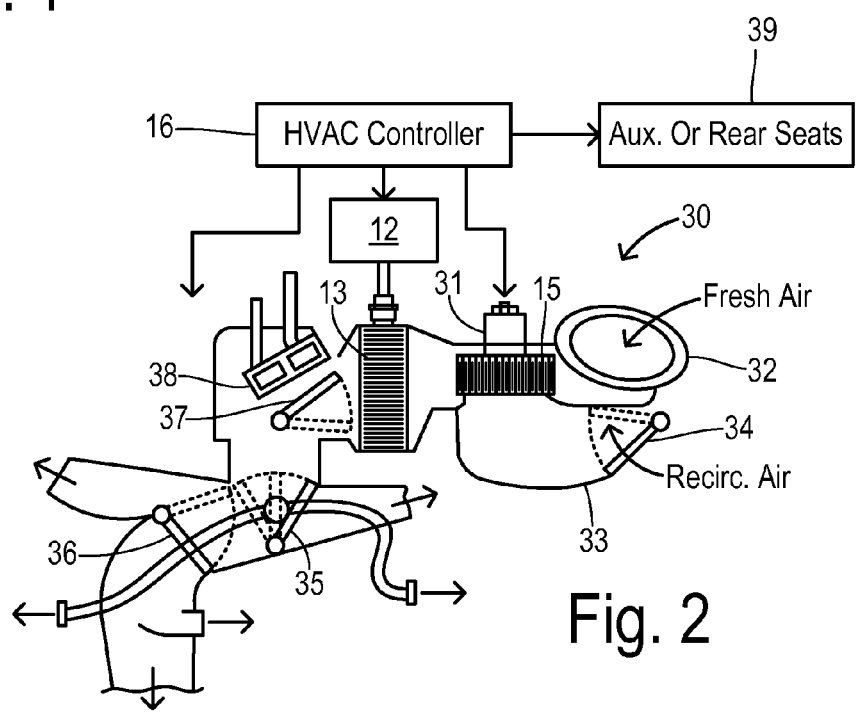
FIG. 2 is a a schematic view showing elements of an HVAC system in greater detail.

Vehicle 10 further includes a wireless communication system 27 with an antenna 28 for communicating with off-vehicle networks and cloud resources (not shown) to obtain crowd data for adapting HVAC operation as described below. First, onboard elements of an HVAC system 30 are described in greater detail in connection with FIG. 2. Blower fan 15 driven by a blower motor 31 receives inlet air comprised of fresh air from a duct 32 and/or recirculated air from a cabin air return vent 33 as determined by a recirculation door 34. System 30 also includes a panel-defrost door 35, a floor-panel door 36, and a temperature blend door 37. Blend door 37 selectably passes air over a heater core 38. Other known air flow regulating devices may be used instead of the illustrated door configuration.

The various doors are driven by any of several types of actuators (including, for example and without limitation, electric motors and vacuum controllers) in a conventional fashion. Control circuit 16 is coupled to each of the movable doors for controlling air temperature and the pattern of air flow via respective command parameters. Control circuit 16 may be further connected to auxiliary HVAC elements or an auxiliary HVAC controller for a rear seating area, for example. Thus, various control algorithms in control circuit 16 have access to a wide array of actuators for adapting many different aspects of HVAC operation.

Figure 3:
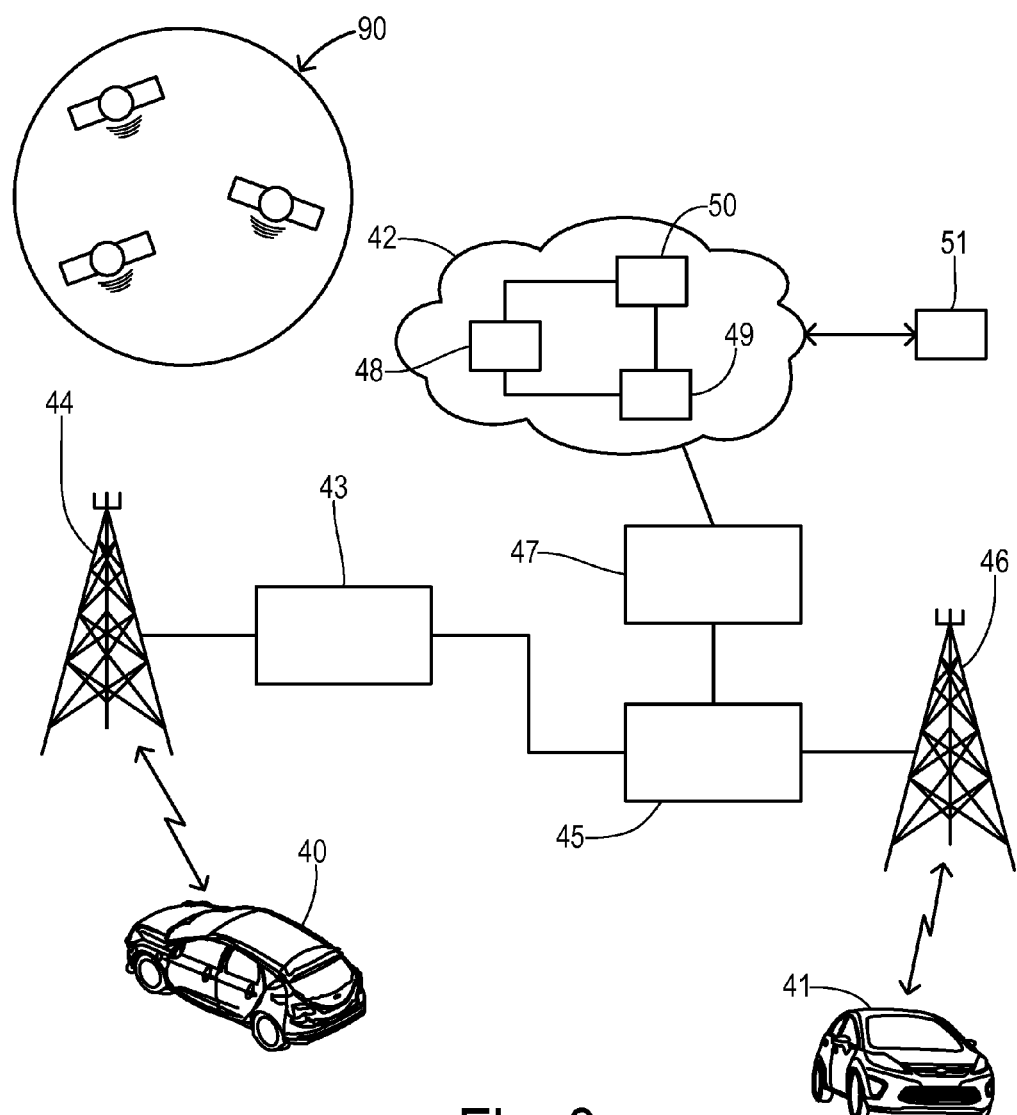
FIG. 3 is a diagram showing vehicle communication with cloud resources over a wireless communication system.

FIG. 3 shows a cloud computing system wherein vehicles 40 and 41 communicate wirelessly with cloud resources 42 via a data communication system based on a mobile, cellular communication system. Vehicle 40 communicates with a cellular carrier network 43 via a cellular tower 44, and vehicle 41 communicates with a cellular provider network 45 via a cellular tower 46. Provider networks 43 and 45 are interconnected. Cloud resources 42 are coupled to the cellular networks via a gateway 47. Cloud 42 may include any arbitrary collection of resources including a plurality of servers 48-50, which may be administered by a service provider such as a vehicle manufacturer or an entity contracted by a vehicle manufacturer. Cloud resources 42 may be further connected with a third party data source or server 51 for obtaining other relevant data, such as regional weather data and forecasts. Vehicles 40 and 41 may preferably include GPS receivers for determining their geographic coordinates using GPS signals from a set of GPS satellites 90.

Figure 4:
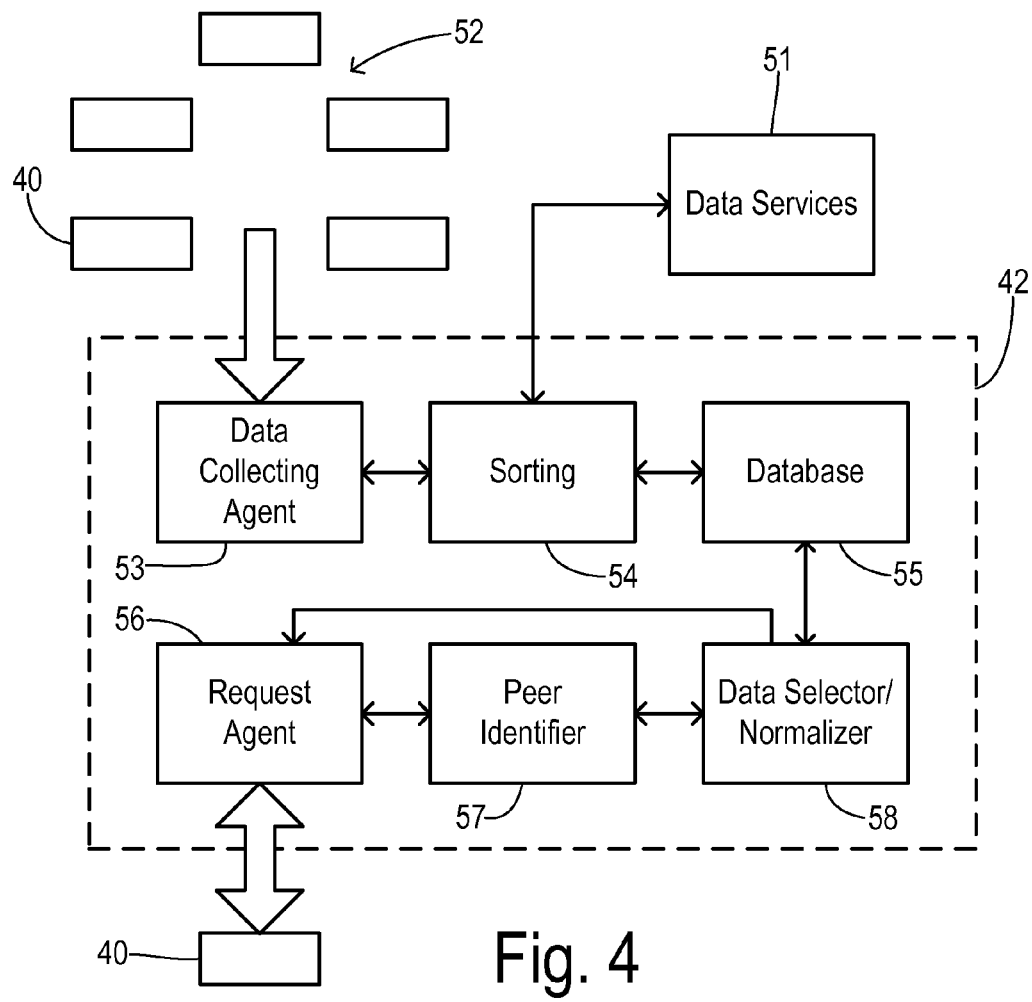
FIG. 4 is a block diagram showing one embodiment of central server resources for providing a remote data service of the invention.

FIG. 4 shows cloud resources 42 in greater detail that are configured for collecting and distributing HVAC-related crowd data useful for adapting operation of vehicle HVAC systems. The vehicles in a vehicle fleet 52 (which includes vehicle 40) transmit data to a data collecting agent 53 within resources 42 whenever each vehicle of fleet 52 is in use. Data sent to collecting agent 53 preferably includes such HVAC-related data as measured climate variables (e.g., temperature and humidity) together with data regarding HVAC system operation including the state of various command parameters (e.g., activation status of heated defrost surfaces, air circulation mode settings, blower speed settings, and any other command parameters whether manually or automatically determined). Each transfer from a fleet vehicle further includes peer parameters that identify a respective vehicle environment so that the relevance of reported data to other vehicles requesting crowd-based information can be determined. The peer parameters identifying a vehicle environment may preferably include location data (such as geographic coordinates of the vehicle determined using GPS) and shelter identification (e.g., whether the reporting vehicle started up in a garage or was outside). The peer parameters may further include occupancy data such as the number and seating positions of occupants within the vehicle. The occupancy data may also include personal identification of an occupant, either personally identifying information or designation according to demographic or other groups. Especially useful are groupings that identify typical HVAC-related preferences or tendencies, such as a type of person who prefers a warmer passenger cabin or cigarette smokers who typically require increased ventilation of fresh air, for example.

Data collected by agent 53 is sorted in a sorting block 54. Sorting is preferably performed at least according to corresponding geographic areas identified in the location data. The sorted data may be indexed according to each peer parameter such as vehicle model type and trim level, occupancy, and other factors. After sorting according to the various indexing parameters, the sorted data is stored in a database 55. Third-party data from data services 51 may also be sorted by sorting block 54 for inclusion in database 55 where it may be indexed according to geographic location, for example. The resulting database 55 is a useful collection of crowd-based data that may assist in adapting HVAC system operation for similarly situated vehicles.

Vehicle 40 is also shown in remote contact with a request agent 56 that handles externally generated requests from subscriber vehicles such as vehicle 40. A request submitted to request agent 56 preferably includes peer parameters of vehicle 40 to be examined in a peer identifier 57 to allow a data selector/normalizer 58 to extract relevant data from database 55. A request may also include an identification of an HVAC mode or actuator for which corresponding crowd-based data is being requested. For example, a request may indicate that the climate control circuit of vehicle 40 is attempting to determine whether one or more defrosting modes or actuator settings should be invoked. Depending upon the severity of the frost or ice on the vehicle windows, various combinations of actuators may be activated such as heated window surfaces, a defrost air circulation mode, and wiper and/or washer operation. For safety reasons, it is desired to quickly initiate the necessary actions to remove frost; but for efficiency reasons, it is desired to only apply the least amount of power required to eliminate the frost. Consulting available crowd data can provide a fast an accurate determination of what may be necessary to handle the defrost situation.

Based upon the peer information identified by peer identifier 57 and upon any specific identification of the actuators or other HVAC systems that may be included in a request, data selector 58 extracts relevant data and then normalizes the data by generating associated weights indicative of a confidence level associated with the extracted crowd data. The weights obtained by normalization may preferably result from a comparison of the peer parameters of the requesting vehicle with the peer parameters of the vehicles that contributed the extracted data. In addition, the weights may be proportional to the statistical significance of the sample size that gives rise to the reported crowd data. For example, a weight would be higher for reported crowd data that comes 1) from (i.e., is supported by) a large number of vehicles of a same or similar model with similar occupancy, and 2) from a close geographic location within a recent time frame.

Figure 5:
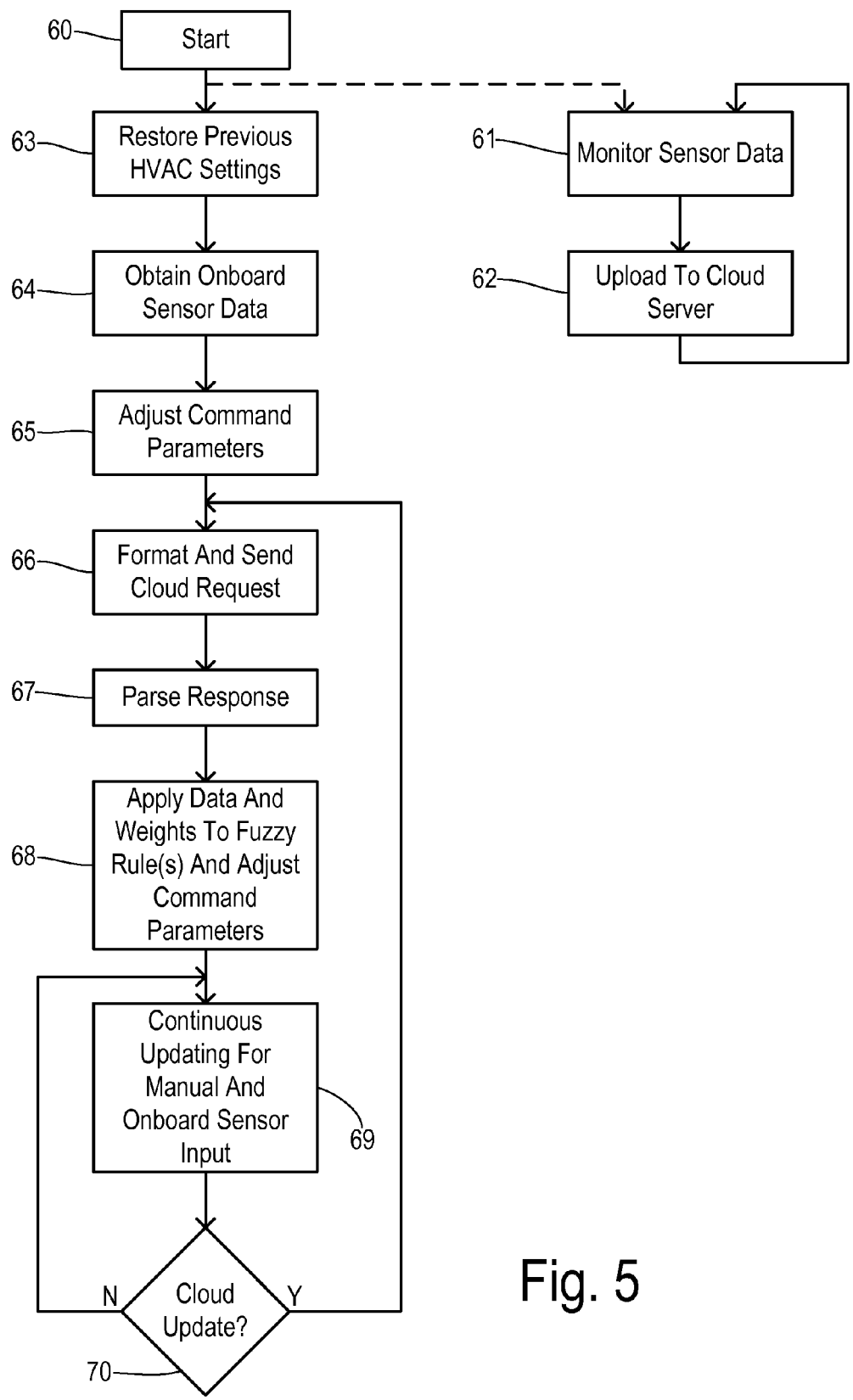
FIG. 5 is a flowchart showing one preferred on-board method of the invention for adaptively controlling an HVAC system.

FIG. 5 shows one preferred operating method for an HVAC climate control system in a vehicle. Upon starting of the vehicle in step 60 (e.g., in response to a remote start signal from a wireless key fob), the HVAC system enters a preconditioning mode. The system begins to periodically send HVAC-related data to the remote server of the cloud-based service. Thus, sensor data is monitored in step 61 and periodically uploaded to the cloud server in step 62. Steps 61 and 62 continue to execute during the time that the vehicle is running.

In the preconditioning event that begins after startup in step 60, some of the previous HVAC settings may be restored in step 63. For example, a temperature setting and air circulation modes may be restored to the values that were in effect at the previous key-off. In step 64, various onboard sensor data is obtained of the type commonly used for automatic HVAC control. Based on the new sensor data, command parameters of the HVAC control circuit are adjusted in step 65 in a conventional manner. Simultaneously, the control circuit formats and sends a cloud request in step 66, wherein the request includes peer parameters for identifying the respective vehicle environment. A request may further identify a particular HVAC function for which relevant data is being sought. For example, when an ambient temperature less than a predetermined temperature is sensed (e.g., below 35°), then a specific request may be made for data showing whether nearby crowd vehicles have activated a defrost function.

The wireless communication system in the requesting vehicle sends the request to the cloud and then receives a response from the cloud which is parsed by the climate control circuit in step 67 in order to recover the relevant items of crowd data, each item being paired with a corresponding weight. In step 68, the data items and corresponding weights are applied to fuzzy rules in the climate control circuit. As a result, corresponding command parameters are generated to adjust the respective HVAC actuators. The use of fuzzy rule sets are generally known for use in climate control in which the state of various sensor or other input data are combined according to fuzzy logic in order to generate a decision output that specifies a command parameter. Thus, the output of the fuzzy rules adapts HVAC operation using crowd-based data which may improve efficiency since actuators are only actuated to the extent that other similar vehicles in close proximity have found it necessary to operate the same actuator in the same way.

In step 69, the command parameters are continually updated based on manual user inputs and in response to onboard sensor inputs. A check is performed in step 70 to determine whether a new cloud request should be sent. A new request may be triggered according to a predetermined time interval or by the detection of certain conditions, such as a detection of precipitation or a significant change in geographic location. If no update is necessary then a return is made to step 70. Otherwise, the method returns to step 66 for formatting and sending an updated cloud request.

Figure 6:
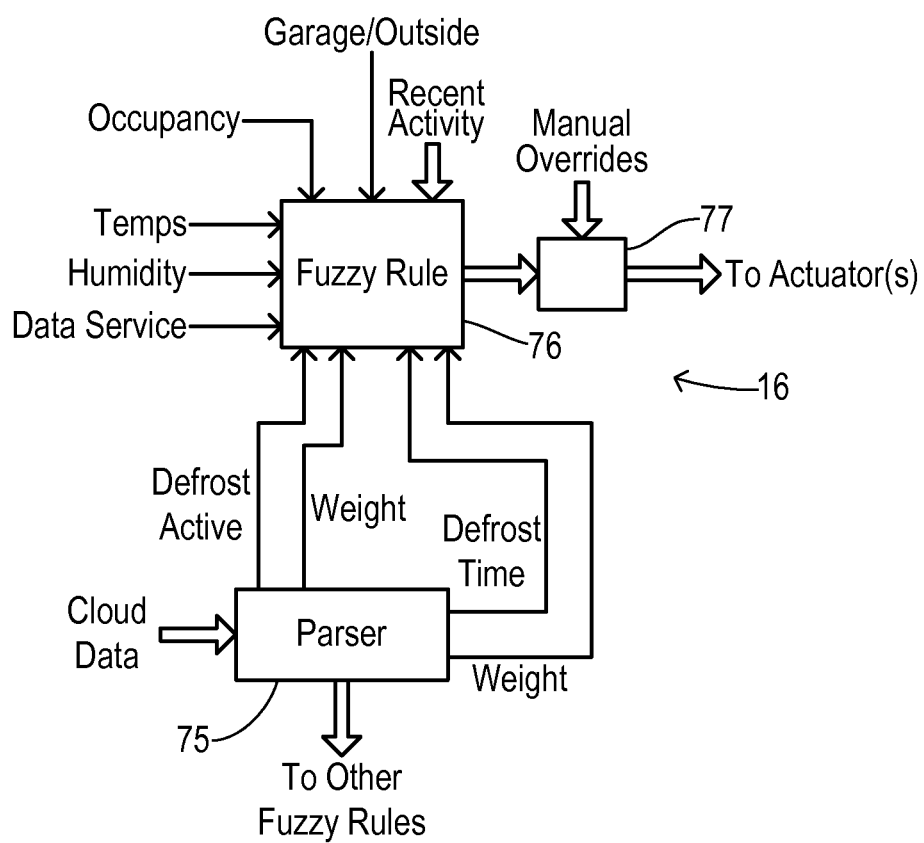
FIG. 6 is a block diagram of a portion of a climate control circuit according to one embodiment of the invention.

FIG. 6 shows a portion of control circuit 16 which parses cloud data from the remote server in a parser 75. Parser 75 recovers crowd data including a defrost activation state and a defrost time, each having an associated weight. The crowd data and weights are applied to a fuzzy rule or fuzzy set 76 which is configured to determine whether various actuators associated with the defrost function should be actuated. This example illustrates just one potential fuzzy rule for which crowd data could be utilized. Those skilled in the art will recognize many additional examples for adapting HVAC operation using crowd data.

Fuzzy rule 76 receives additional inputs including interior and ambient exterior temperature data, humidity data, occupancy data, and shelter data (which identifies whether the vehicle is parked in a garage or outside). Additional input data may include recent activity which characterizes whether the vehicle was recently driven and/or a recent history of temperature fluctuations. The use of fuzzy logic to combine various inputs including the cloud data representing whether other users have activated their defrosting actuators and/or the amount of time for which defrost was utilized, requires weight data that reflects the confidence level or relevance of the crowd data so that it can be appropriately factored into the decision reached by fuzzy rule 76. As previously described, the weight may be proportional to the degree of similarity between the requesting vehicle and selected vehicles found in the crowd database. For example, the defrost activation status of vehicles would be more relevant for vehicles of the same general type and for vehicles in closer geographic proximity than for vehicles farther away. Thus, the remote cloud server may normalize the crowd data as follows. The data selector/normalizer may select a set of vehicles within a certain distance of the requesting vehicle to calculate a percentage of vehicles with their defrost functions active. A weight may be determined which is proportional to an average distance of such vehicles from the requesting vehicle. Thus, the percentage would be discounted in the event that most of the included vehicles were relatively farther away. A weight may further be proportional to a statistical sample size wherein the weight is assigned a higher value when a larger number of potentially relevant vehicles are found in the database. If few vehicles are found then the weight would be smaller and the fuzzy rule would be less affected by the crowd data.

The output of fuzzy rule 76 is provided to an input of a signal gate 77. A control input of gate 77 receives a manual override signal whenever the driver has manually set a defrost function on or off. The output of fuzzy rule 76 is coupled to the relevant actuators only when a manual override has not occurred.

Figure 7:
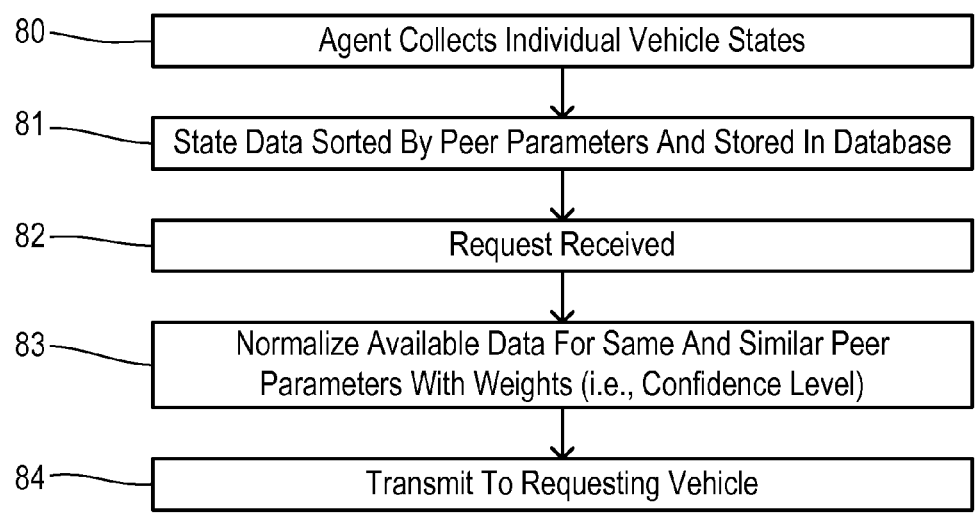
FIG. 7 is a flowchart showing a method of operating central cloud resources for collecting and distributing crowd data according to one embodiment of the invention.

Operation of the cloud resources for providing an HVAC cloud data service to support HVAC system operation is shown in FIG. 7. In step 80, a collection agent collects individual vehicle states, wherein each state may include HVAC-related data and related peer parameters in order to allow matching up the crowd data to subsequent requests. In step 81, the vehicle state data is sorted according to the peer parameters or attributes and the sorted data is stored in a database. After a request is received in step 82 from a requesting vehicle, the cloud resources normalize the available data for the same or similar peer parameters with appropriate weights that indicate a confidence level which is used to scale the influence of the crowd data when input to fuzzy logic rules in the requesting vehicle. The cloud resources transmit the crowd data and weights to the requesting vehicle and step 84.

The crowd resources may be implemented by a vehicle manufacturer to support operation of HVAC systems in a fleet of vehicles which it has manufactured. The manufacturer is in the best position to coordinate interaction between vehicles and the central server system so that the appropriate data is collected, sorted, and normalized in a manner that supports meaningful functional requests at the vehicle level.

What is claimed is:

1. A motor vehicle comprising:
    a heating, ventilating, air conditioning (HVAC) system including a climate control circuit coupled to a plurality of onboard sensors, a human-machine interface, and a plurality of climate actuators, wherein the actuators are responsive to respective command parameters generated by the control circuit in response to the sensors and the human-machine interface;
    a wireless communication system for transmitting vehicle HVAC data to and receiving crowd data from a remote server;
    wherein the control circuit initiates a request for crowd data via the communication system to the remote server, and wherein the request includes peer parameters for identifying a vehicle environment;
    wherein the control circuit receives a response via the communication system from the remote server, and wherein the response comprises crowd data and at least one weight indicating a confidence level associated with the crowd data; and
    wherein the control circuit generates at least one command parameter using a set of fuzzy rules responsive to the crowd data and the weight from the response.

2. The motor vehicle of claim 1 wherein the peer parameters include location data of the vehicle.

3. The motor vehicle of claim 1 wherein the location data is comprised of geographic coordinates.

4. The motor vehicle of claim 1 wherein the location data is comprised of shelter identification.

5. The motor vehicle of claim 1 wherein the peer parameters include occupancy data.

6. The motor vehicle of claim 5 wherein the occupancy data includes a personal identification of an occupant of the vehicle.

7. The motor vehicle of claim 5 wherein the occupancy data includes a number and seating positions of occupants in the vehicle.

8. The motor vehicle of claim 1 wherein the peer parameters include identification of a vehicle type.

9. The motor vehicle of claim 1 wherein the weight is proportional to a similarity of the peer parameters contained in the request with peer parameters associated with vehicle HVAC data received by the remote server from other vehicles and used by the remote server to generate the crowd data.

10. The motor vehicle of claim 1 wherein the weight is proportional to a statistical sample size associated with vehicle HVAC data received by the remote server from other vehicles and used by the remote server to generate the crowd data.

11. The motor vehicle of claim 1 wherein the control circuit initiates the request during a preconditioning event prior to a driver entering the vehicle.

12. The motor vehicle of claim 11 wherein the control circuit initiates the request in response to a predetermined condition sensed by the onboard sensors, and wherein the request identifies an actuator function to which the requested crowd data relates.

13. The motor vehicle of claim 12 wherein the predetermined condition is comprised of an ambient temperature below a predetermined temperature, and wherein the actuator function identified in the request is comprised of a defrost function.

14. The motor vehicle of claim 13 wherein the crowd data for the defrost function includes a defrost setting of an air handling unit, operation of heated glass surfaces, and operation of window washers and wipers.

15. The motor vehicle of claim 11 further comprising a remote start system, wherein the preconditioning event is initiated by a remote start command received by the remote start system.

* * * * *